US008491795B2

(12) United States Patent
Chen

(10) Patent No.: US 8,491,795 B2
(45) Date of Patent: Jul. 23, 2013

(54) CONVERSION OF SEAWATER TO DRINKING WATER AT ROOM TEMPERATURE

(75) Inventor: Kenneth Yat-Yi Chen, Rancho Palos Verdes, CA (US)

(73) Assignee: Kenneth Yat-Yi Chen, Palos Verdes, CA (US)

( * ) Notice: Subject to any disclaimer, the term of this patent is extended or adjusted under 35 U.S.C. 154(b) by 76 days.

(21) Appl. No.: 13/368,227

(22) Filed: Feb. 7, 2012

(65) Prior Publication Data

US 2013/0056416 A1  Mar. 7, 2013

Related U.S. Application Data

(63) Continuation-in-part of application No. PCT/US2011/050263, filed on Sep. 1, 2011.

(51) Int. Cl.
B01D 61/58 (2006.01)
C02F 1/44 (2006.01)
B01D 15/00 (2006.01)

(52) U.S. Cl.
USPC ........... 210/651; 210/650; 210/749; 210/806; 210/669; 210/903

(58) Field of Classification Search
USPC ....................................... 210/903
See application file for complete search history.

(56) References Cited

U.S. PATENT DOCUMENTS

| 3,130,156 | A | * | 4/1964 | Neff | 210/177 |
| 4,879,030 | A |  | 11/1989 | Stache |  |
| 5,098,575 | A |  | 3/1992 | Yaeli |  |
| 5,670,053 | A | * | 9/1997 | Collentro et al. | 210/652 |
| 6,159,382 | A | * | 12/2000 | Conant et al. | 210/712 |
| 6,391,205 | B1 |  | 5/2002 | McGinnis |  |
| 6,849,184 | B1 |  | 2/2005 | Lampi et al. |  |
| 7,914,680 | B2 | * | 3/2011 | Cath et al. | 210/644 |
| 2003/0201225 | A1 | * | 10/2003 | Josse et al. | 210/605 |
| 2004/0195160 | A1 | * | 10/2004 | Max et al. | 210/177 |
| 2005/0006305 | A1 | * | 1/2005 | Juby et al. | 210/603 |
| 2005/0056590 | A1 | * | 3/2005 | Baggott et al. | 210/652 |
| 2006/0144789 | A1 | * | 7/2006 | Cath et al. | 210/641 |
| 2012/0067819 | A1 | * | 3/2012 | McGinnis | 210/640 |

OTHER PUBLICATIONS

Taiwo et al. Potability Assessment of Selected Brands of Bottled Water in Abeokuta, Nigeria. J. Appl. Sci. Environ. Manage. vol. 14 (3) (2010) p. 47-52.*
Drewes et al. Can nanofiltration and ultra-low pressure reverse osmosis membranes replace RO for the removal of organic micropollutants, nutrients and bulk organic carbon?—A pilot scale investigation. Proceedings of the Water Environment Federation, WEFTEC 2005: Session 81 through Session 90, pp. 7428-7440.*
Awadalla et al. Removal of ammonium and nitrate ions from mine effluents by membrane technology. Separation Science and Technology. vol. 29, No. 4 (1994), abstract only.*
Hydration Technologies, Inc., "HTI—Forward Osmosis Overview." MSSC 2012, available at http://www.multi-statesalinitycoalition.com/storage/summit/2012/presLampi.pdf.

* cited by examiner

*Primary Examiner* — Katherine Zalasky
(74) *Attorney, Agent, or Firm* — Chien-Ju Alice Chuang

(57) ABSTRACT

An apparatus and methods for converting seawater to drinking water at room temperature include using the processes of osmosis, vacuum stripping, nanofiltration, ion exchange, and breakpoint chlorination, to provide a low-cost alternative to prior seawater conversion methods.

10 Claims, 5 Drawing Sheets

AMMONIA STRIPPER LAYOUT

PROCESS FLOW DIAGRAM

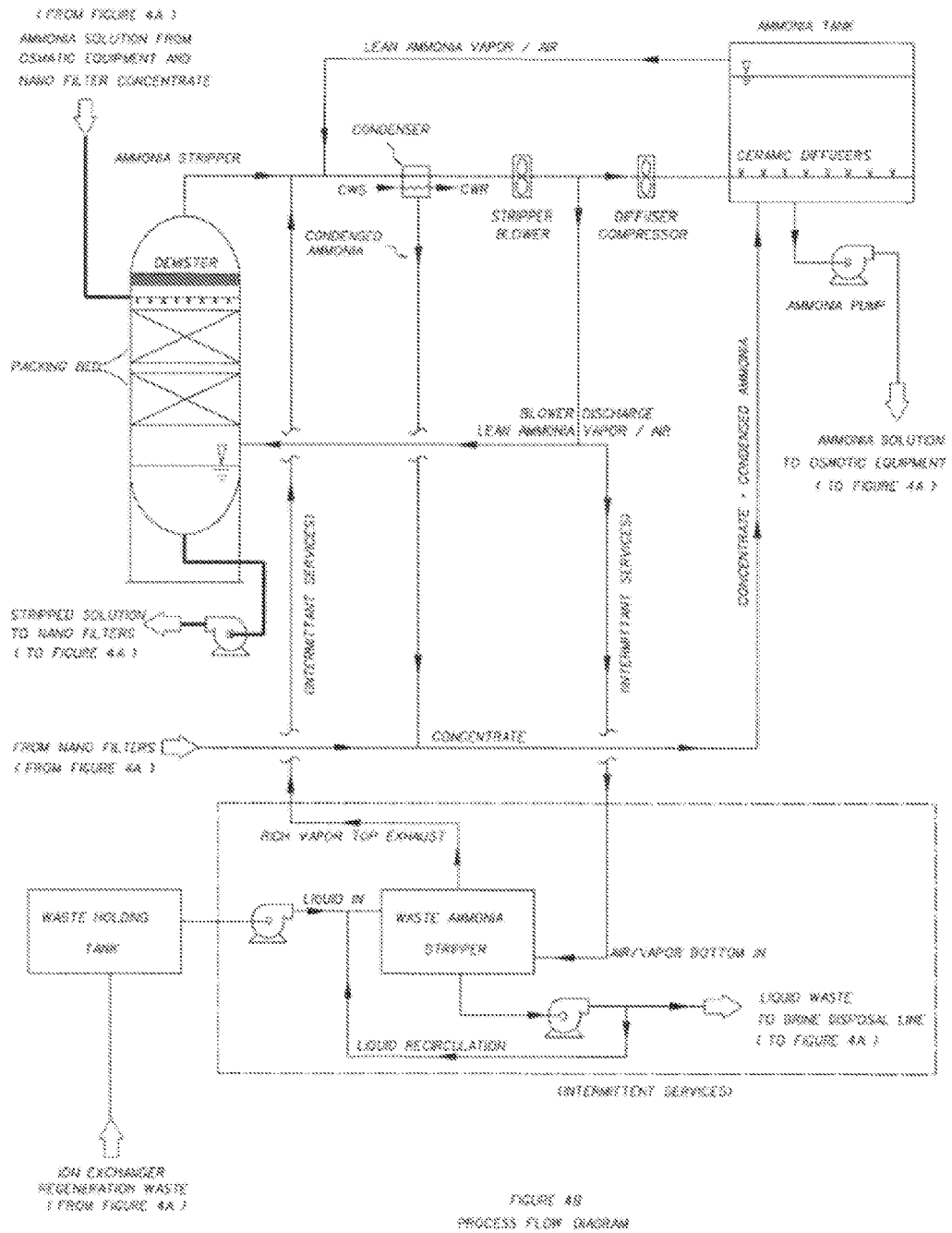

CONVERSION OF SEAWATER TO DRINKING WATER AT ROOM TEMPERATURE

REFERENCE TO RELATED APPLICATIONS

This is a continuation-in-part of PCT Application No. PCT/US2011/050263, filed Sep. 1, 2011, and entitled "Conversion of Seawater to Drinking Water at Room Temperature," which is incorporated by reference herein for all purposes.

FIELD

The present invention generally relates to seawater utilization and, more specifically, to apparatus and methods for the conversion of seawater to drinking water at room temperature.

BACKGROUND OF THE INVENTION

Typically, seawater is converted to drinking water by distillation, or reverse osmosis desalinization processes. Recent advances in Forward Osmosis processes utilizing concentrated draw solutions can result in lowering the temperature and pressure requirements. However, it still requires elevated temperatures far above normal seawater temperature to evaporate the chemicals used as solutes in the draw solution. The elevated temperatures, pressure, and energy requirements of typical seawater conversion processes result in large, expensive, energy-inefficient processing plants for large-scale conversion.

Due to population growth and universal desires to improve the living conditions, there is an urgent need to increase the supply of potable water. Increase in water reuse and many conservation methods may help to alleviate the shortage, however, increase in supplies would provide additional relief.

Thus, there is a need for a less expensive, more energy-efficient process of producing drinking water from seawater.

SUMMARY OF THE INVENTION

In one aspect of the present invention, an apparatus comprises an intake chamber, at least one chamber for reverse hydration under vacuum conditions to strip ammonia from the solution, which is coupled to the osmotic chamber, at least one chamber for pressurized nanofiltration, coupled to at least one vacuum stripping chamber, at least one ion exchange column coupled to at least one nanofiltration chamber, a breakpoint chlorination chamber coupled to at least one ion exchange column, and an output from the breakpoint chlorination chamber.

In another aspect of the present invention, a method comprises taking seawater into an intake chamber, conducting micro-filtration of particulates by directing the filtered seawater from the intake chamber into an osmotic chamber, allowing osmosis of water molecules through a membrane located between the seawater and a concentrated ammonia solution in the osmotic chamber, wherein the concentrated ammonia solution is converted to a diluted solution through the osmosis step, adjusting the pH of the diluted solution to approximately 11.5, removing ammonia from the diluted solution using ammonia stripping under vacuum conditions followed by at least one chamber for nanofiltration, adjusting the pH of the diluted solution to approximately neutral after nanofiltration, removing ammonia from the diluted solution using at least one ion-exchange column after the nanofiltration, and removing ammonia from the diluted solution using breakpoint chlorination after ion exchange.

In yet another aspect of the present invention, a method comprises allowing osmosis between seawater and a concentrated ammonia solution, resulting in a diluted solution, stripping ammonia from the diluted solution under vacuum conditions at an elevated pH level followed by pressurized nanofiltration, removing ammonia from the diluted solution using ion exchange, and performing breakpoint chlorination on the diluted solution.

These and other features, aspects and advantages of the present invention will be described in more detail with reference to the following drawings, description and claims.

BRIEF DESCRIPTION OF THE DRAWINGS

FIGS. 4A-4B show process flow diagrams for conversion of seawater to potable water according to an embodiment of the present invention.

DETAILED DESCRIPTION OF THE INVENTION

The following detailed description describes exemplary embodiments of the invention, which may be implemented in various ways, including as a system, a process, or an apparatus. The description is not to be taken in a limiting sense, but is made merely for the purpose of illustrating various examples of the invention.

Various inventive features are described below that can each be used independently of one another or in combination with other features.

Embodiments of the present invention provide techniques for converting seawater to drinking water by undergoing osmosis with a concentrated ammonia solution, removing ammonia from the solution using vacuum-stripping of ammonia followed by nanofiltrations at an elevated pH, which will result in an effluent with ammonia concentration of 300 mg/L or less, removing ammonia from the solution using ion-exchange methods, and a breakpoint chlorination step to remove any remaining ammonia in the solution.

Figure 1:
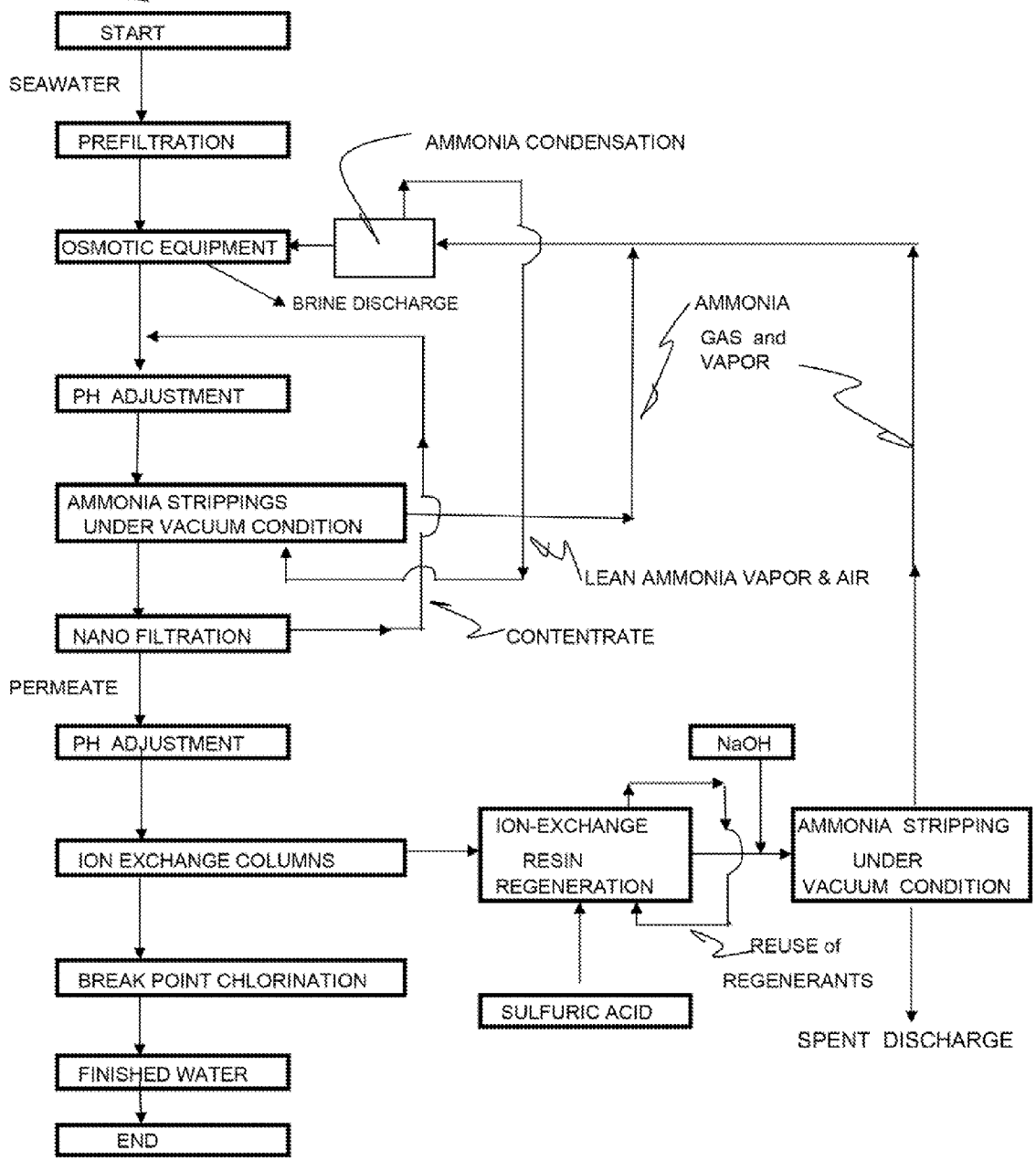
FIG. 1 shows a schematic flow diagram for conversion of seawater to potable water according to an embodiment of the present invention.
Figure 2:
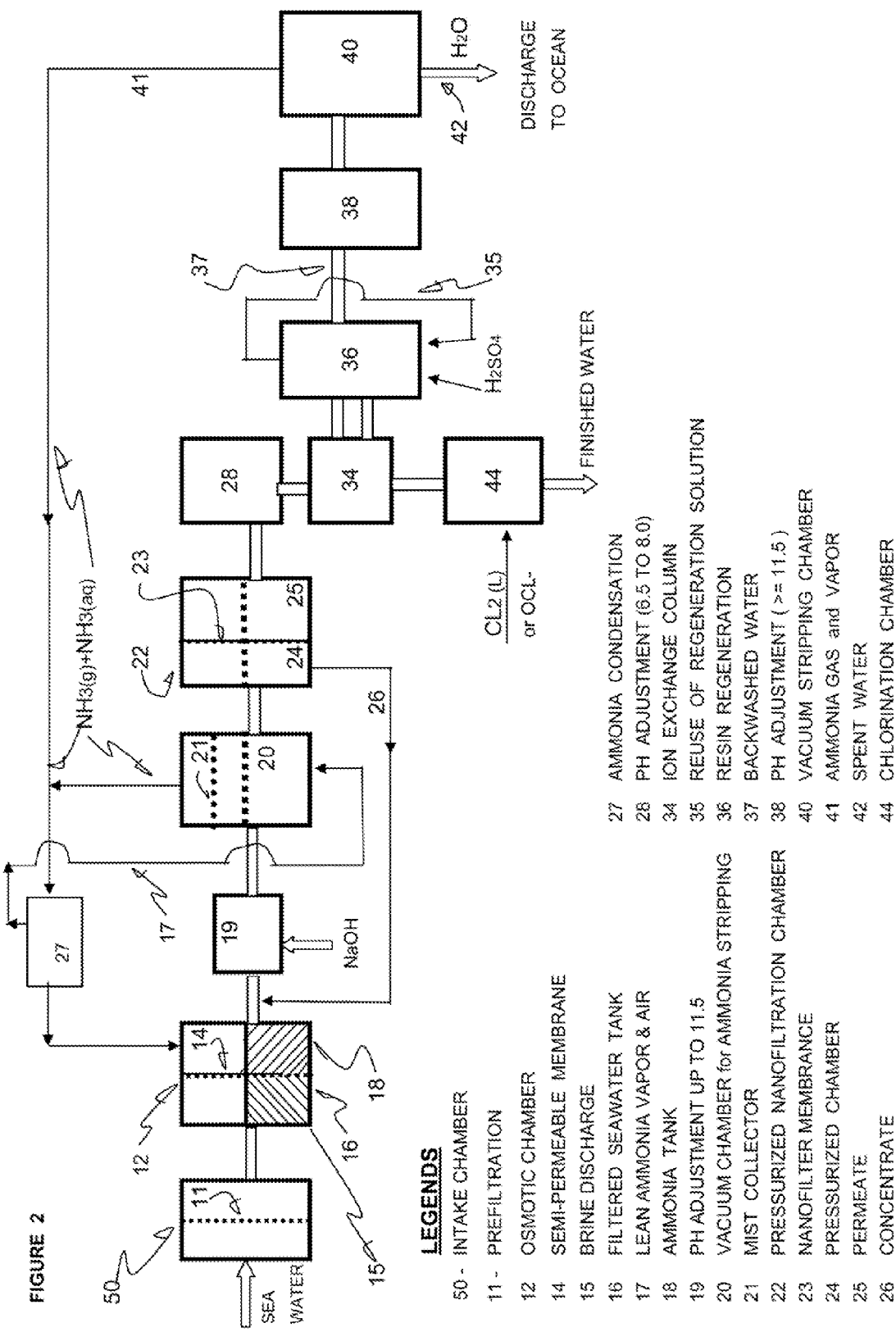
FIG. 2 shows a block diagram of an apparatus for conversion of seawater to potable water according to an embodiment of the present invention.
Figure 3:
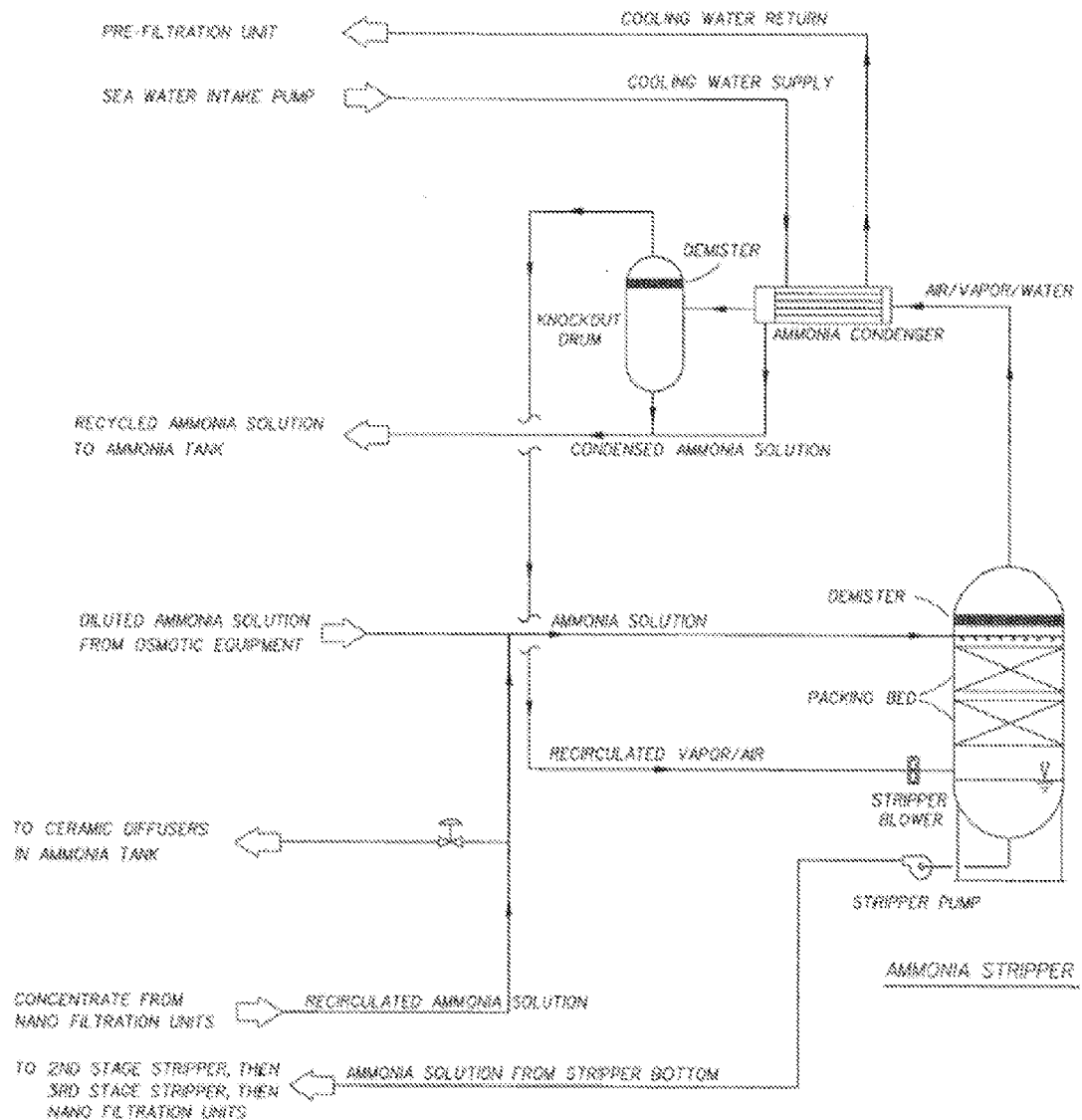
FIG. 3 shows an apparatus for vacuum stripping of ammonia according to an embodiment of the present invention.
Figure 4A:
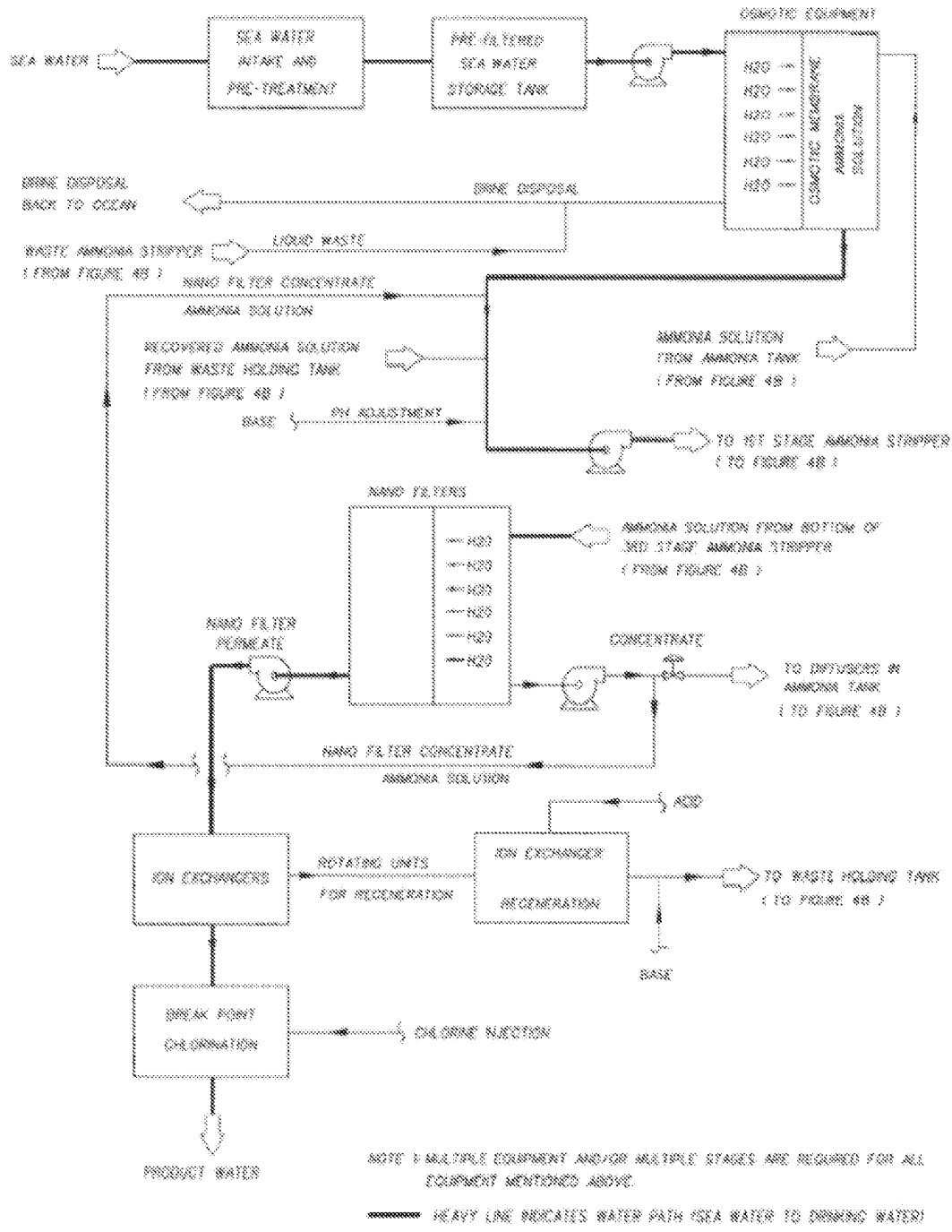

Referring to FIGS. 1, 2, 3 and 4A-4B, the conversion apparatus may include several chambers for different processing stages described in process 10. The first chamber may be a seawater intake chamber 50, which may be equipped with a microfilter, typically for the removal of objects measuring larger than approximately 5 microns. The intake chamber 50 may be connected to an osmotic chamber 12. The osmotic chamber 12 may have an osmotic membrane 14 with a seawater tank 16 on one side and an ammonia tank 18, containing a concentrated ammonia solution, on the other side. The seawater may enter the seawater tank 16 from the intake chamber 50, and using the osmotic membrane 14, water molecules may migrate into the ammonia tank 16 to a solution that may typically contain approximately 10 molar ammonia as a solute. The concentration of ammonia in the ammonia tank 18 may be greatly diluted, e.g. 5 times, through the osmotic process. The pH of diluted solution may then be adjusted to around 11.5, typically using sodium hydroxide. The solution may then be introduced to a vacuum stripping chamber 20. The operation of vacuum stripping may be adjusted for extended duration or multistage strippings to achieve an effluent with ammonia concentration of 5,000 mg/l or less. The stripped ammonia gas and mist may then be passed through a condensation chamber 27, with the condensed ammonia returning to ammonia tank 18, the escaped gas and vapor, which is a mixture of lean ammonia gas and air returning to the ammonia stripping chamber 20. The stream after the last chamber of the ammonia stripping operation may then be introduced to a pressurized nanofiltration chamber 22. A moderate pressure of approximately 150 to 200 psi is maintained in Chamber 24, separated by Nanofilter 23.

The portion of stream flowing over the membrane, but not through it, is called concentrate (or retentate or reject) which is retained in Chamber 24. The concentrate 26 (e.g., approximately 10% of the total stream) is then re-circulated back to Chamber 19 for pH adjustment. The remainder of the stream (e.g., approximately 90% of the total stream) in Chamber 25 is identified as permeate (or filtrate).

The permeate in Chamber 25 is led to Chamber 28 for pH adjustment to a neutral region (e.g., approximately 6.5 to 8) using an appropriate acid (e.g., sulfuric acid).

The water may then be passed through a series of ion exchange columns 34 for ammonia removal, typically decreasing the ammonia concentration in the water to less than 3 mg/L. The ion exchange resin may be regenerated using a concentrated sulfuric acid, or other appropriate concentrated acid solution. The solution can be recirculated until the solution is almost saturated with ammonium sulfate, the backwashed water 37 may lead to Chamber 38 for pH adjustment. Concentrated sodium hydroxide solution may be used to adjust the pH of the solution to above 11.5, and ammonia gas may eventually be removed by vacuum stripping column 40. The gas and vapor from Vacuum Chamber 40 may be directed to ammonia condensation tank 27. The spent solution (which contains high concentrations of $Na^+$, $SO_4^{-2}$, and ammonia) may then be diluted with brine from chamber 16 and discharged back to the ocean.

In some embodiments, nanofilter 23 may be a thin-film composite type having polyamide surface layer with supporting porous sub-layer made of polysulfone, or any other suitable nanofilter as documented in the aquaculture and mining industry. The nanofilter membrane can be modified to raise the operating PH level to 12. The nanofilter may have the following qualities: a) a moderate to high level of flux to minimize the size requirements, b) high rejection rates of both ionic and nonionic species, e.g., both aqueous ammonia and ammonia ion, and c) membrane pore sizes as small as practical (e.g., approximately 10 Å or less). At a pH of 11, the ratio of $NH_3(aq)$ to $NH_4^+$ is about 30 to 1, and at the pH value of 11.5, the ratio becomes approximately 100 to 1, which favors the retention of ammonia in Chamber 24 due to the following factors:
  a) the nanofilter rejects the passage of uncharged molecules such as $NH_3(aq)$; and
  b) the radius of hydrated ammonia ion is approximately 5.35 Å, which may be retained by a nanofilter with a pore size of approximately 10 Å or less (i.e., the ammonia ions have diameters of approximately 10.7 Å (i.e., 5.35× 2)).

The efficiency of the ammonia retention in chamber 24 also depends on the uniformity of the pore size of membrane 23. In order to produce a filtrate with ammonia concentrations of 300 mg/l, a mixture of one and two passes of nanofiltration may be required.

To achieve an acceptable level of flux for routine operation, application of approximately 150 to 200 psi on Chamber 24 may be required. While higher psi may be acceptable, they are not required for proper operation of the conversion process.

The pH of the water after nanofiltration may then be adjusted to almost neutral (e.g., approximately 6.5 to 8.0) in chamber 28, typically using an appropriate acid (e.g., sulfuric acid). The water may then be passed through a series of ion exchange columns 34, decreasing the ammonia concentration in the water to less than 3 mg/l.

The ion exchange resin may be regenerated using concentrated sulfuric acid, or other appropriate concentrated acid solution. This solution can be recirculated until the solution is almost saturated with ammonium sulfate. The backwashed water output 37 is then led to tank 38 for pH adjustment. Concentrated sodium hydroxide solution may then be used to adjust the pH of the solution to about 11.5, and ammonia gas and vapor may eventually be removed by vacuum stripping 40. The resulting ammonia gas and vapor may then go through condenser 27 before returning to the ammonia tank 18. Since the backwashed water volume is relatively small in comparison with main water stream, it may be first diverted to a wastewater holding tank and it may then be subjected to vacuum stripping, followed by condensation of ammonia. An extra ceramic diffuser tank can be used to buffer the excessive volume of concentrate and condensed ammonia and intermittent nature of the backwashed wastewater. as shown in FIG. 4B. The spent solution 42, which may contain high concentrations of sodium ion, sulfate, and some residual ammonia, may be diluted with brine from chamber 16 before discharging back to the ocean.

The water may then undergo breakpoint chlorination, for example in chamber 44, in which the remaining ammonia in the water may be oxidized to nitrogen gas and chloramines using liquid chlorine or hypochlorites. The resulting water product may contain total dissolved solids of approximately 150 mg/L or less with a free chlorine level of approximatel 0.2 mg/L to 1 mg/L.

In the process according to an embodiment of the present invention, the ammonia concentration of the solution exiting the osmotic chamber may be in the range of approximately 30,000 mg/L even after a 5-time dilution through the osmotic process. The physical process of reverse hydration of ammonia under vacuum conditions (i.e., ammonia stripping) will then convert the aqueous ammonia into gaseous ammonia and mist, which are led to the condensation chamber. The diluted effluent with ammonia concentration of approximately 5,000 mg/l or less will then be subjected to nanofiltration at a pressure of approximately 150 to 200 psi. The nanofiltration can be one pass-through or two passes-through to obtain a mixture with ammonia concentrations of approximately 300 mg/l or less, which can then be further polished in ion exchange processes to reduce the effluent concentration of ammonia to approximately 3 mg/l or less.

The breakpoint chlorination in Chamber 44 will further remove the remaining ammonia through oxidation.

To counter the corrosive nature of high concentrations of ammonia, the apparatus is made only of corrosive-resistant materials, such as stainless steel, polypropylene, or other corrosive-resistant material. All gaskets should be made of ethylene propylene diene monomer (EPDM). Any connections should be properly welded together to prevent leaks. The handling and collection of ammonia gas and vapor should follow the protocols as those practiced in the manufacturing of high end electronic components and high density circuitry.

The seawater conversion process of the present invention may include the following steps, as described above:
  1) Natural osmosis between solutions of different concentrations, 2) Vacuum stripping of ammonia at an elevated pH level, and the condensation of ammonia collected from the vacuum tube from the gas phase into liquid form.
3) Nanofiltration to separate additional ammonia from the water stream,
4) Ion exchange to remove a moderate level of ammonia in solution, and
5) Breakpoint chlorination.

Drinking water, industrial water, and water for recreational usage may be produced by the process of the present invention. Moreover, the process could be used for industrial wastewater treatment. The chemicals involved are acid, base, ammonia, and chlorine. Chlorine may be used in very small concentrations, and recovery of ammonia is almost 100%.

The spent water is the backwashed water from the regeneration of ion exchange resin after the majority of ammonia in the backwashed water has been removed by vacuum stripping. Depending on the restrictions on the discharge water, the duration of vacuum stripping can be varied. The spent water contains mostly sodium sulfate, some bases, and ammonia. The spent water can also be greatly diluted with brine from the seawater side of osmotic before discharge. The present invention may reduce the cost of desalinization of seawater to that of obtaining drinking water from freshwater sources. For example, the conversion processes shown in FIGS. 4A and 4B with three-stage vacuum stripping and two-stage ion exchange will consume approximately 1.6 to 1.9 KW-hr of electricity for one cubic meter of seawater, instead of the 4 to 5 KW-hrs required in prior art processes for converting the same amount of seawater.

The process of the present invention may eliminate the need for temperature elevation or the application of high pressure for the desalinization of seawater, except for cases in which "room temperature" is below freezing.

The present invention, as described herein, may provide a completely closed system capable of removing ammonia in relatively high concentrations and without releasing any ammonia to the atmosphere or requiring prohibitively expensive nitrification/denitrification processes. The adaptation of the physical separation of ammonia by vacuum stripping and nanofiltration achieves the goal of low-cost seawater conversion.

It should be understood, of course, that the foregoing relates to exemplary embodiments of the invention and that modifications may be made without departing from the spirit and scope of the invention as set forth in the following claims.

What is claimed:
1. A method, comprising:
   directing the seawater into an osmotic chamber;
   allowing osmosis of water molecules through a membrane located between the seawater and a concentrated ammonia solution in the osmotic chamber, wherein the concentrated ammonia solution is converted to a diluted solution during the osmosis step;
   adjusting the pH of the diluted solution to around 11.5;
   removing some ammonia from the diluted solution using at least one vacuum stripping chamber;
   removing additional ammonia using a nanofilter configured to separate a concentrate and a permeate, the nanofilter having a high rejection rate of concentrated solutions comprising ionic ammonia species and another high rejection rate of concentrated solutions comprising nonionic ammonia species;
   adjusting the pH of the permeate to approximately neutral pH after nanofiltration;
   removing some remaining ammonia from the permeate using at least one ion-exchange column after the nanofiltration; and
   removing additional remaining ammonia from the diluted solution using breakpoint chlorination after ion exchange,
   wherein the method is performed at a temperature above freezing without a need for heating or cooling.

2. The method of claim 1, further comprising the step of removing objects measuring at least 5 microns from the seawater using a microfilter.

3. The method of claim 1, wherein the step of removing ammonia using vacuum stripping further comprises:
   producing an exiting gas and vapor stream comprising ammonia; and
   directing the gas and vapor stream into a condensation chamber, wherein ammonia is condensed and directed to an ammonia tank in the osmotic chamber, wherein uncondensed ammonia residue and a portion of the gas and vapor stream are circulated back to an ammonia stripping chamber.

4. The method of claim 1, wherein the concentrate undergoes a pH adjustment to approximately 11.5 and the permeate undergoes a pH adjustment to between the range of 6.5 to 8.0.

5. The method of claim 1, wherein the removing some remaining ammonia from the permeate is performed until the ammonia concentration of the diluted solution is decreased to less than 3 mg/L.

6. The method of claim 1, wherein the diluted solution comprises 150 mg/L or less of dissolved solids after the breakpoint chlorination step.

7. The method of claim 1, wherein the finished water comprises a free chlorine level between 0.2 mg/L to 1 mg/L after the breakpoint chlorination step.

8. A method, the steps comprising:
   allowing osmosis between seawater and a second solution, resulting in a diluted solution;
   stripping ammonia from the diluted solution at an elevated pH level under vacuum conditions;
   separating an amount of ammonia from the diluted solution using a nanofilter having a high rejection rate of concentrated solutions comprising ionic ammonia species and another high rejection rate of concentrated solutions comprising nonionic ammonia species;
   adjusting the pH of a permeate to approximately neutral pH after nanofiltration;
   removing another amount of ammonia from the diluted solution using ion exchange; and
   performing breakpoint chlorination on the diluted solution,
   wherein the method is performed at a temperature above freezing without a need for heating or cooling.

9. The method of claim 8, further including removing objects measuring at least 5 microns from the seawater.

10. The method of claim 8, further comprising condensing the ammonia, wherein a condensed ammonia solution is returned to the ammonia tank in an osmotic chamber.

* * * * *